United States Patent [19]

Mewald

[11] Patent Number: 4,944,116
[45] Date of Patent: Jul. 31, 1990

[54] SENSOR STRIP

[75] Inventor: Franz Mewald, Teesdorf, Austria

[73] Assignee: Mewald Gesellschaft m.b.H., Pottendorf, Austria

[21] Appl. No.: 400,557

[22] Filed: Aug. 30, 1989

[30] Foreign Application Priority Data

Sep. 1, 1988 [AT] Austria ............................. 2139/88

[51] Int. Cl.⁵ ............................................. E05F 15/20
[52] U.S. Cl. ............................................. 49/27; 49/28;
 200/61.43; 250/227.21; 250/227.32; 250/231.1
[58] Field of Search ................................ 49/25–28;
 200/61.43; 250/222.1, 231 P; 340/555, 556

[56] References Cited

U.S. PATENT DOCUMENTS

| 4,143,367 | 3/1979 | Schestag | 340/545 X |
| 4,274,226 | 6/1981 | Evans | 49/26 X |
| 4,482,890 | 11/1984 | Forbes et al. | 340/556 |

FOREIGN PATENT DOCUMENTS

| 382925 | 4/1987 | Austria . | |
| 829210 | 1/1952 | Fed. Rep. of Germany | 49/26 |
| 2432063 | 1/1976 | Fed. Rep. of Germany | 49/26 |
| 3107847 | 2/1982 | Fed. Rep. of Germany . | |
| 2658660 | 7/1984 | Fed. Rep. of Germany . | |

Primary Examiner—Philip C. Kannan
Assistant Examiner—Jerry Redman
Attorney, Agent, or Firm—Herbert Dubno

[57] ABSTRACT

A sensing strip for stopping or reversing the drive of a door or other movable member having an edge along which the hollow light guide profile is provided. The sensing strip has an elongated hollow body connected to the edge of the door by a support and is formed internally with a hollow light guide profile forming the leading edge with the body. This profile has an elongated slit which spreads upon deformation of said body to permit escape of light forming light beam traversing the hollow light guide profile, thereby diminishing the lighting reaching a receiver at an end of the sensing strip.

10 Claims, 2 Drawing Sheets

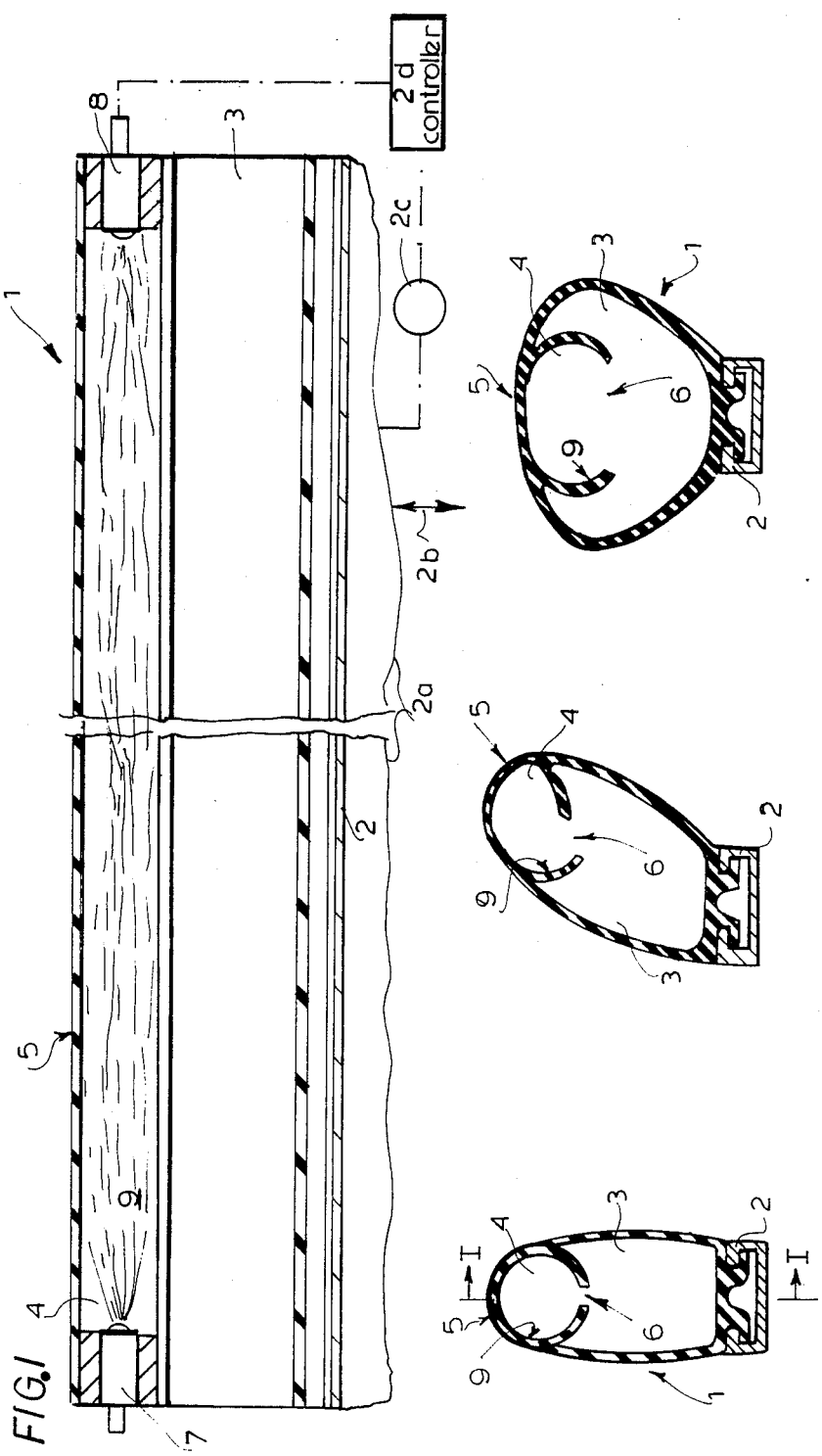

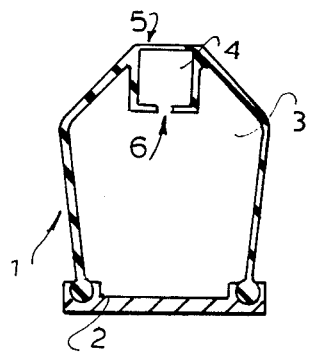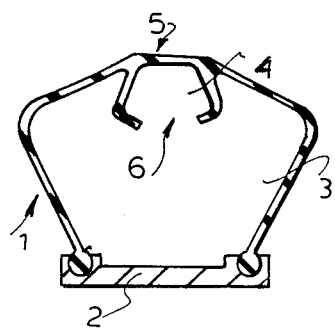
FIG.5  FIG.6
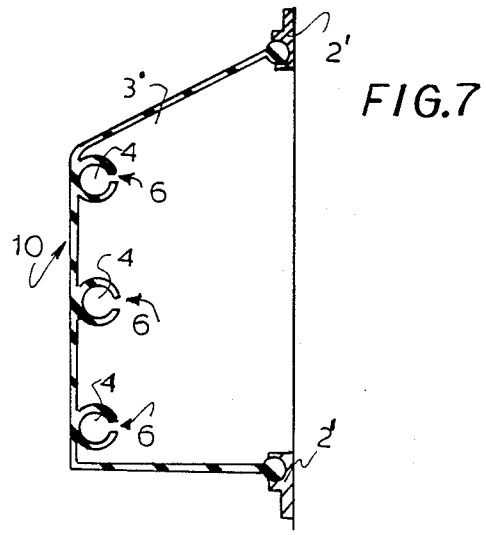
FIG.7
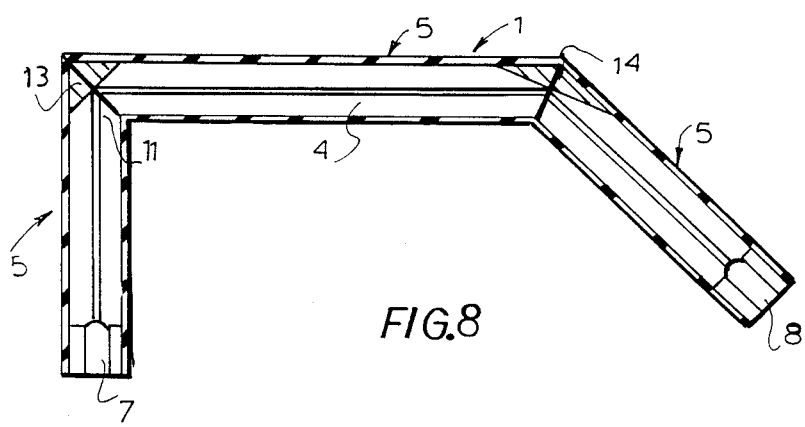
FIG.8

SENSOR STRIP

FIELD OF THE INVENTION

My present invention relates to a sensor strip in the form of a yieldable hollow body which, if desired, can serve as a sealing member and which is provided on an edge of a door or other movable member and can cut off a drive when the sensor strip comes to abutment at the end of the path of that movable member or engages an obstruction in the path.

More particularly, the invention relates to a sensor strip of the aforedescribed type, which can be provided on an elevator door, a door of a vehicle or conveyance, an automatic building door, or any other mechanically driven door and which comprises a hollow body in the interior of which a light curtain or beam is provided and in which at least a part of the light beam extends along a deformable portion of the strip so that, upon deformation of the strip there will be a weakening of the detected light which can be used to switch off or reverse the drive.

BACKGROUND OF THE INVENTION

Sensor strips of the aforedescribed type can be used for automatic control of the displacement of a door and can be provided along a closing edge thereof, to avoid endangering people or objects in the path of the closing edge and to insure that the closing edge reaches a fully closed position. In many cases the sensor strip can also fulfill a sealing function in the closed position.

Prior art sensor strips which are commercially available function with an air pressure wave generated in an elastic hose or tube. When the sensor strip provided with such a hose containing air encounters an obstruction, a deformation of the tube results in a pressure wave in the tube which is guided by the latter to a membrane switch. The switch, in turn, can control the drive for the door. Because the air pressure wave generated in this manner has a comparatively low amplitude the membrane switch must be unusually sensitive and experience has shown that such highly sensitive membrane switches generally have relatively limited life spans. The failure of the membrane switch may result in extreme danger and can cause harm and even fatal injury. As a consequence, in this field efforts have been made to provide self-monitoring or self-testing systems so that upon a failure in the function of the sensor, the entire apparatus will be switched off and dangerous conditions prevented from occurring.

In German Patent No. 2,719,438, a self-monitoring sensing strip is described which operates in accordance with the quiescent current or rest current principle and which utilizes a strip switch having at an outer end, a measuring resistor across the two conductors. As a consequence, in the rest or inactivated position, a current flow is defined by the resistance. Upon interruption of the supply line, a monitoring circuit can generate an alarm. Apart from the relatively high cost of the sensor and this equipment, there is the disadvantage that at the ends at which contact terminals are provided and where the profile is sealed to make it watertight, the device is not functional to sense an obstruction.

Furthermore, the device is directionally sensitive, i.e. is sensitive to forces applied from above in only one direction and is not sensitive to lateral forces.

In German Open Application DE-OS No. 3107847, a similar construction is provided in which electromagnetic waves, for example, light waves, are transmitted through a curved, closed hollow profile element. By detection of the light intensity at a location remote from the light force and resulting from a reduction in the cross section of the light passage because of deformation of the hollow profile, a control pulse can be provided to the drive for the window to be closed. Since the hollow profile is closed except for vent openings and is lined with reflective material, the response of this prior art construction is slow and can lead to problems.

To avoid these drawbacks a sensor strip has been developed, in the interior of which a light curtain or beam is provided in which at least in part of the light beam passes along the part of the sensor strip to be deformed upon contact with an obstruction or the end of the path of the moving member. Such deformation of the strip results in an interruption of the light beam to switch off the drive of the moving part or reverse the drive.

In the rest position or with undisturbed movement of the doors, the detector of the light beam is fully illuminated so that in this state the circuit of the drive system is not interrupted. When the door encounters an obstruction and the sensor strip is deformed, the illumination of the sensor is strongly diminished or is interrupted so that the sensor via conventional and preferably electronic circuitry, can interrupt the current supply to the drive or reverse it to thereby prevent injury or damage with a high degree of reliability.

Since the system will shut down or reverse in the event of a failure of illumination of a sensor as a result of a power failure or any other interruption in the light beam, the sensor is self-monitoring and self reliable.

A sensor strip of this type is described in German Open Application DE-OS No. 2658660.

The light beam of the light curtain in this system runs through a hollow profile with an approximately circular inner cross section. To interrupt the light path from the source to the receiver, the internal cross section of the hollow profile must at least at one location, be completely constricted.

Such a complete closure of the interior of a tubular body is not possible if that body has a relatively large wall thickness as is often required for sealing purposes or for a long useful life of the strip. Consequently, even with relatively strong inward compression of the hollow profile there maybe a substantial portion of light which reaches the receiver from the source. As a consequence, the above-described light curtain may not be completely reliable and capable of responding to all contacts with obstruction, may be excessively sensitive with respect to response to insure that a compression of the deformable member will effect the desired response, or will not switch in an entirely satisfactorily manner.

Thus in Austrian Patent No. 382,925, a patent has been described that will allow reliable interruption of a light path of the light curtain when a predetermined deformation of the sensor strip is exceeded. In this system, within the interior of the sensor strip, webs of the yieldable material with diaphragm openings are provided for passage of the light beam. As long as the light beam transverses all of the openings and the openings remain fully aligned, the sensor will receive light. With deformation of the strip one or more of the openings or webs can be disaligned with respect to others to insure an interruption.

Even this system, however, has been found to be insufficiently sensitive in practice and it has been found that, to achieve a complete interruption of the light path with this system and the systems described earlier, it has been necessary to provide a very strong deformation of the sensor strip. Even those systems which do not require complete interruption for a response generally require a strong deformation of the sensor strip to obtain the response. Indeed, systems in which a weakening of the light path is detected often have internal reflection which partly compensates for the weakening so that here as well strong deformation is necessary.

OBJECTS OF THE INVENTION

It is, therefore, the general object of this invention to provide an improved sensor strip which will overcome the drawbacks outlined above and which will be more sensitive and consequently more reliable.

More specifically, it is an object of this invention to provide a sensor strip for the purposes previously described but in which even with reduced and relatively small deformations of a type to which earlier sensors have not been responsive or with which they could not have been triggered, will yield a reaction from the sensor.

SUMMARY OF THE INVENTION

These objects and others which will become apparent hereinafter are attained in accordance with the present invention in a sensing strip for a movable member adapted to be disposed along an edge thereof and comprising a support extending along this edge and advantageously constituted of a support profile, a resiliently deformable elongated hollow member, affixed to this support and advantageously constituted as a relatively thin-wall hollow profile, the deformable member having a forward portion forming a leading edge and a rearward portion affixed to the support, a light source disposed at one end of said hollow member and directing a beam of light into the hollow member, a receiver responsive to said light disposed at an opposite end of the hollow member and upon which said beam is directed in the absence of distortion of the beam, and an elongated light guide in the form of a hollow profile affixed within the aforementioned member at the leading or front edge thereof, surrounding said light beam and forming a confinement for the light beam.

This elongated hollow profile is provided with a slit turned toward the interior of the hollow member which, upon deformation of the hollow member serves as a light outlet permitting the escape of light from the interior of the light guide and allowing attenuation of the light beam.

As a consequence, the light receiver can respond to the diminished amplitude of light to signal an interruption in the movement of the door or other member upon which the sensing strip is provided.

Because the resiliently deformable light guide, which may be molded or otherwise formed unitarily with the hollow member or body deforms when the hollow member is deformed, to spread the opening formed by the slit, a greater part of the light which is internally reflected in the light guide can stream out through the spread slit. Even relatively small deformations of the sensing strip, therefore, can be detected with high reliability since the slit tends to open widely with even small displacements and deformations preventing undesired internal reflections from reaching the receiver or detector.

To insure uniform spread of the slit at each location there along, I provide the slit so that it is parallel to the axis of the light guide hollow profile. It has also been found to be advantageous to have the slit extend over the entire length of the light curtain or light path.

For use of the sensing strip on movable members having a wide contact surface which may engage in obstruction, it has been found to be advantageous to provide within the hollow member a plurality of individual light guide hollow profiles having respective light curtains or beams.

For monitoring obstruction along edges or surfaces which are nonstraight, the individual light beam or light beams may be angularly reflected at spaced apart locations by mirrors disposed within the individual light guide hollow profile.

BRIEF DESCRIPTION OF THE DRAWING

The above and other objects, features and advantages of my invention will become more readily apparent from the following description, reference being made to the accompanying highly diagrammatic drawing in which:

FIG. 1 is a longitudinal section of a first embodiment of a sensing strip according to the invention as taken along the line I—I of FIG. 2;

FIG. 2 is a transverse cross section through the sensing element of FIG. 1 in an undeformed state;

FIGS. 3 and 4 are cross sectional views similar to FIG. 2 showing various deformations capable of triggering a response of the sensing strips of FIGS. 1 and 2;

FIGS. 5 and 6 are cross sectional views of the undeformed sensing strip and a deformed sensing strip illustrating another embodiment of the invention;

FIG. 7 is a cross section through another embodiment of the invention; and

FIG. 8 is a longitudinal section through an embodiment in which the protected edge of the moving member or element is angled.

SPECIFIC DESCRIPTION

In FIG. 1, I have shown a sensing strip 1 which comprises a support member or profile 2 which can be mounted on an edge of a door 2a which can be moved in the direction of an arrow 2b by a drive 2c. The drive 2c is controlled by a reversing controller 2d responding to the receiver 8 which can be a photoelectric cell and appropriate circuitry for switching the drive to stop the door or to reverse it.

The sensing strip 1 further comprises a deformable hollow body 3 which can be composed of rubber or another elastomeric material, in which at a leading edge 5 but internally is provided with a hollow profile 4 which may be referred to hereinafter as a light guide profile. The hollow profile 4 maybe molded unitarily from the elastomeric material with the hollow body 3.

The hollow body 3 in the embodiment of FIGS. 1 through 4 is shown as a closed oval.

In the embodiment of FIGS. 5 and 6, it is shown as a 5-sided polygonal structure open toward the support 2.

In the embodiment of FIG. 7 the hollow body 3' is open toward the edge of the door and is mounted in 2 support members 2' and forms a 4-sided polygonal figure. Practically any other hollow cross sectional shape can be used as well. In each case, the hollow body 3 or 3' is formed with one or more beads or ribs engaged in complementary grooves of the support strip 2 or 2'.

In all of the embodiments, the or each of the light guide hollow profiles 4 is mounted in the hollow body 3 or 3' at the forwarded most part of the sensing strip 1 and can constitute a part of the leading edge of the sensing strip. The hollow light guide profile 4 extends into the hollow body 3 or 3' and has walls spaced from the walls of the hollow body therein and delimiting between them a longitudinally extending slit 6.

The hollow light guide profiles shown in FIGS. 1 through 4 and 7 on the one hand and in FIGS. 5 and 6 on the other hand have a circular and a square cross section, respectively, in the rest positions, although other profiles shapes can be used, e.g. other polygonal shapes.

At one end of each hollow light guide source or transmitter 7 is provided and on the opposite end, the sensor strip is provided with a respective light receiver 8.

The inner wall 9 of each hollow profile 4 is coated or otherwise treated to render it light reflective. The light reflective characteristic can be accomplished by simply providing a smooth surface if desired. It can also be accomplished by an effective choice of materials. For example, when the elastomeric body and the light guide profile are constituted of a silicone rubber or having a silicone layer applied to the interior of the light guide profile, a reflective aspect is insured.

As can be seen from FIG. 7, when the hollow body 3' is comparatively wide, a plurality of projecting light guide hollow profiles 4 with respective light sources and light receivers can be provided in the interior of the hollow body. In the illustrated embodiment, 3 such light guide profiles 3' are provided. It will be apparent that other combinations of such hollow light guide profiles maybe used as required.

The forwarded edge 5 of the embodiments of FIGS. 1 through 6 are comparatively narrow whereas the embodiment of FIG. 7 allows a relatively wide abutment edge 10 to be used. With a wider edge and a plurality of the hollow light guide profiles 4, a response can be achieved with distortion to spread the slit of only one of the hollow profiles 4.

When the system is employed for edges which point around corners or are angled, the light guide hollow profiles can also be bent as has been illustrated diagrammatically in FIG. 8. In this case, at each corner or bend 11, 12 in the light path between the source 7 and the receiver 8, a mirror 13 or 14 can be provided to insure that the light beam, in the nondeformed sensing strip, will be targeted upon the receiver 8.

In the rest position, the sensing element 1 of FIG. 1 will assume the position shown in FIG. 2. If a lateral force is applied to the sensing element 1, the hollow body 3 is deformed in the manner shown in FIG. 3. It will be immediately apparent that with such deformation and indeed in any direction of the hollow body 3, the slit 6 will spread substantially from its narrow rest state.

The internally reflected light largely escapes through the spread slit and by appropriate adjustment of the sensitivity of the light detector 8, it can be insured that switching can be effected to shut off the drive or reverse it even with a complete definition of the sensing strip.

In FIG. 4, the effect of a force applied directly to the front edge 5 has been illustrated. The slit 6 opens even more widely, resulting in even greater light loss through the spread slit.

Upon such opening of the slit, the light escapes without any significant reflection back in through the slit so that there is a sharp reduction in the light reaching the receiver. Note that there is no surface proximal to the slit to reflect light back into the latter. The embodiment of FIGS. 5 and 6 function similarly (compare FIGS. 4 and 6, for example).

With the embodiment of FIG. 7, it suffices to have the control circuit $2d$ respond to the drop in light intensity of any one of the receivers of the 3 light curtains below a predetermined threshold level before bringing the door to standstill or reversing its direction.

In the embodiment of FIG. 8, there is an additional advantage in that deformations applied to any of the edges 5 will not only open the slit, but will also shift the positions of the mirrors 13 or 14 to further reduce the intensity of the light detected by the receiver 8. The same applies when the configuration of FIG. 7 is used in the embodiment of FIG. 8 and the forces are applied to the edges 10.

It is also possible, in accordance with the invention to provide the light force in proximity to the receiver at one end of the sensing strip and to provide a mirror at the opposite end of the sensing strip so that each light curtain consists of two beams. The self monitoring of the reliability of the systems is insured when the light curtains uses an alternating contact as the input to switch on upon application of the voltage and to cut off when the light beam is interrupted or the current supply is disturbed.

I claim:

1. A sensing strip for a movable member having an edge and a drive for said movable member, said sensing element comprising:
    an elongated hollow elastically deformable body extending along said edge;
    a support connecting said body to said edge and extending therealong;
    a hollow light guide profile formed in said body at a side thereof opposite said support and constituting a leading edge portion with said hollow body, said hollow light guide profile being provided with a slit within said body whereby a light from said light beam traversing said hollow light guide profiles can escape upon spreading of said slit;
    a light source generating said light beam at one end of said body directing said light beam into said hollow light guide profiles; and
    a light receiver operatively connected to said drive for controlling same and disposed to receive said light beam in an undeformed state of said body, whereby a deformation force applied to said body spreads said slit and reduces light reaching said receiver.

2. The sensing strip defined in claim 1 wherein said hollow light guide profile has an axis, said slit being parallel to said axis.

3. The sensing strip defined in claim 1 wherein said slit extends substantially the entire length of said light beam.

4. The sensing strip defined in claim 1 wherein said body is formed with a plurality of mutually parallel hollow light guide profiles each having a respective slit and a respective light beam.

5. The sensing strip defined in claim 1 wherein said hollow light guide profile is angled along the length thereof, further comprising mirrors at angled portions of said hollow light guide profile targeting said beam on said receiver in an undeformed state of said body.

6. The sensing strip defined in claim 1 wherein the interior of said hollow light guide profile is internally reflected.

7. The sensing strip defined in claim 1 wherein said hollow light guide profile has a circular cross section.

8. The sensing strip defined in claim 1 wherein said hollow light guide profile has a polygonal cross section.

9. The sensing strip defined in claim 1 wherein said body has an oval cross section.

10. The sensing strip defined in claim 1 wherein said body has an open prismatic cross section.

* * * * *